United States Patent
Chiu et al.

(10) Patent No.: US 11,444,842 B2
(45) Date of Patent: Sep. 13, 2022

(54) NETWORK SWITCH AND NETWORK SWITCH SYSTEM THEREOF

(71) Applicant: REALTEK SEMICONDUCTOR CORP., Hsinchu (TW)

(72) Inventors: Chih-Ming Chiu, Hsinchu (TW); Kai-Wen Cheng, Hsinchu (TW); Yu-Yi Lin, Hsinchu (TW); Yi-Hsuan Fan, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 67 days.

(21) Appl. No.: 17/188,303

(22) Filed: Mar. 1, 2021

(65) Prior Publication Data

US 2022/0052920 A1 Feb. 17, 2022

(30) Foreign Application Priority Data

Aug. 13, 2020 (TW) .................. 109127628

(51) Int. Cl.
*H04L 41/12* (2022.01)
*H04L 41/0654* (2022.01)

(52) U.S. Cl.
CPC .......... *H04L 41/12* (2013.01); *H04L 41/0654* (2013.01)

(58) Field of Classification Search
CPC ....... H04L 45/48; H04L 12/462; H04L 45/28; H04L 45/02; H04L 41/12; H04L 45/18; H04L 45/22; H04L 45/00; H04L 12/4641; H04L 43/0811; H04L 12/4625; H04L 12/4633; H04L 45/16; H04L 45/66; H04L 12/185; H04L 12/437; H04L 2101/622; H04L 41/0816; H04L 45/04; H04L 12/18; H04L 12/40169; H04L 41/0663; H04L 41/0672; H04L 45/26; H04L 45/50; H04L 47/125; H04L 47/41; H04L 49/25; H04L 49/30; H04L 49/351; H04L 49/555; H04L 49/557; H04L 12/1863; H04L 12/1868; H04L 12/28; H04L 12/40176;
(Continued)

(56) References Cited

U.S. PATENT DOCUMENTS 6,032,194 A * 2/2000 Gai .................. H04L 45/28
709/224
6,628,624 B1 * 9/2003 Mahajan ............ H04L 45/48
370/252
(Continued)

*Primary Examiner* — Greg C Bengzon
(74) *Attorney, Agent, or Firm* — Birch, Stewart, Kolasch & Birch, LLP

(57) ABSTRACT

A network switch and a network switch system thereof are provided. The network switch includes a plurality of connection ports and a processing circuit. When any of the connection ports receives a first abnormal message packet and one of the connection ports is in a disabled state, the processing circuit sets the connection port in the disabled state to switch to an enabled state, and the processing circuit does not forward the first abnormal message packet in the single loop network. When one of the connection ports is abnormal and each of the connection ports forming the single loop network is in the enabled state, the processing circuit sets the abnormal connection port to switch to the disabled state, and transmits a second abnormal message packet to other network switches in the single loop network through another connection port that is not abnormal.

14 Claims, 4 Drawing Sheets

(58) Field of Classification Search
CPC ....... H04L 12/42; H04L 12/44; H04L 12/467; H04L 12/4675; H04L 12/4687; H04L 12/4695; H04L 2012/4629; H04L 41/0618; H04L 41/0654; H04L 41/0668; H04L 41/0681; H04L 41/0813; H04L 41/083; H04L 41/0833; H04L 41/0869; H04L 41/0893; H04L 41/22; H04L 43/08; H04L 43/0817; H04L 43/0852; H04L 43/0876; H04L 43/10; H04L 45/021; H04L 45/025; H04L 45/12; H04L 45/125; H04L 45/24; H04L 45/245; H04L 45/32; H04L 45/44; H04L 45/52; H04L 45/563; H04L 47/20; H04L 49/15; H04L 49/253; H04L 49/254; H04L 49/354; H04L 49/55; H04L 49/552; H04L 49/65; H04L 5/0012; H04L 63/0263; H04L 65/70; H04L 65/80; H04L 69/14; H04L 69/324; H04L 69/40; H04L 9/40

See application file for complete search history.

(56) References Cited

U.S. PATENT DOCUMENTS

| | | | | |
|---|---|---|---|---|
| 6,801,506 B1* | 10/2004 | Dey | H04L 45/00 | 370/256 |
| 7,593,319 B1* | 9/2009 | Sivasankaran | H04L 49/351 | 370/219 |
| 8,724,517 B1* | 5/2014 | Bulusu | H04L 12/4641 | 370/254 |
| 10,721,163 B1* | 7/2020 | Kalyanaraman | H04L 45/245 | |
| 10,999,195 B1* | 5/2021 | Suryanarayana | H04L 45/16 | |
| 11,038,718 B2* | 6/2021 | Doney | G06F 16/2379 | |
| 11,153,181 B1* | 10/2021 | Tsai | H04L 41/0895 | |
| 11,159,403 B1* | 10/2021 | Kaddoura | H04L 41/22 | |
| 11,165,689 B2* | 11/2021 | Zhang | H04L 45/745 | |
| 11,252,082 B1* | 2/2022 | Saad | H04L 45/123 | |
| 11,374,812 B2* | 6/2022 | Srinivas | H04L 41/0823 | |
| 11,374,848 B2* | 6/2022 | Retana | H04L 45/42 | |
| 2003/0142680 A1* | 7/2003 | Oguchi | H04L 45/18 | 370/400 |
| 2004/0179524 A1* | 9/2004 | Sasagawa | H04L 45/18 | 370/389 |
| 2005/0013260 A1* | 1/2005 | Ramanathan | H04L 45/48 | 370/256 |
| 2005/0071672 A1* | 3/2005 | Fung | H04L 63/0263 | 726/4 |
| 2005/0076140 A1* | 4/2005 | Fung | H04L 12/4625 | 709/245 |
| 2006/0203735 A1* | 9/2006 | Takatori | H04L 12/462 | 370/242 |
| 2008/0025203 A1* | 1/2008 | Tallet | H04L 41/0663 | 370/216 |
| 2010/0220633 A1* | 9/2010 | Stilling | H04L 12/462 | 370/256 |
| 2010/0290479 A1* | 11/2010 | Baron | H04L 12/4625 | 370/401 |
| 2012/0063306 A1* | 3/2012 | Sultan | H04L 12/4625 | 370/235 |
| 2012/0155245 A1* | 6/2012 | Zhang | H04L 12/437 | 370/216 |
| 2012/0224510 A1* | 9/2012 | Bulusu | H04L 45/02 | 370/256 |
| 2013/0024580 A1* | 1/2013 | Tsai | H04L 41/0816 | 709/230 |
| 2014/0192677 A1* | 7/2014 | Chew | H04L 41/0833 | 370/254 |
| 2014/0233563 A1* | 8/2014 | Chen | H04L 12/185 | 370/390 |
| 2015/0195324 A1* | 7/2015 | Kim | H04L 65/80 | 709/219 |
| 2015/0207688 A1* | 7/2015 | Cheng | H04L 45/02 | 370/256 |
| 2015/0304247 A1* | 10/2015 | Poggi | H04L 45/26 | 370/401 |
| 2016/0294632 A1* | 10/2016 | Bhatia | H04L 41/22 | |
| 2018/0026872 A1* | 1/2018 | Manthiramoorthy | H04L 45/28 | 370/249 |
| 2019/0109764 A1* | 4/2019 | Sweeney | H04L 41/0869 | |
| 2019/0124185 A1* | 4/2019 | Merkel | H04L 69/22 | |
| 2019/0227812 A1* | 7/2019 | Akkineni | G06F 9/4416 | |
| 2020/0021535 A1* | 1/2020 | Sitaraman | H04L 45/28 | |
| 2020/0036622 A1* | 1/2020 | Tamizkar | H04L 45/18 | |
| 2020/0068005 A1* | 2/2020 | De Angelis | H04L 45/02 | |
| 2020/0084819 A1* | 3/2020 | Abedini | H04W 76/18 | |
| 2020/0099616 A1* | 3/2020 | Nguyen | H04L 45/04 | |
| 2020/0136721 A1* | 4/2020 | Cohn | H04L 45/28 | |
| 2020/0154336 A1* | 5/2020 | Islam | H04W 24/02 | |
| 2020/0177401 A1* | 6/2020 | Kebler | H04L 12/44 | |
| 2020/0244516 A1* | 7/2020 | Murray | H04L 43/0811 | |
| 2020/0280490 A1* | 9/2020 | Srinivas | H04L 41/0893 | |
| 2020/0322286 A1* | 10/2020 | Mehta | H04W 40/24 | |
| 2020/0328944 A1* | 10/2020 | Zhang | H04L 43/0805 | |
| 2020/0351973 A1* | 11/2020 | Mannweiler | H04W 88/06 | |
| 2021/0029045 A1* | 1/2021 | Prasad | H04L 47/283 | |
| 2021/0036967 A1* | 2/2021 | Agarwal | H04L 49/90 | |
| 2021/0083969 A1* | 3/2021 | Abdul | H04L 45/021 | |
| 2021/0135901 A1* | 5/2021 | Xie | H04L 12/4625 | |
| 2021/0152464 A1* | 5/2021 | Brissette | H04L 45/50 | |
| 2021/0168039 A1* | 6/2021 | Chen | H04L 41/12 | |
| 2021/0243107 A1* | 8/2021 | Retana | H04L 45/04 | |
| 2021/0297344 A1* | 9/2021 | He | H04L 45/44 | |
| 2021/0306252 A1* | 9/2021 | Jain | H04L 45/18 | |
| 2021/0328829 A1* | 10/2021 | Nagarajan | H04L 45/74 | |
| 2021/0328904 A1* | 10/2021 | Winchell | H04L 45/48 | |
| 2021/0367853 A1* | 11/2021 | Clark | H04L 41/0213 | |
| 2021/0367906 A1* | 11/2021 | Xiao | G06F 13/4022 | |
| 2021/0377166 A1* | 12/2021 | Brar | H04L 45/66 | |
| 2022/0045943 A1* | 2/2022 | Hu | H04L 49/30 | |
| 2022/0052920 A1* | 2/2022 | Chiu | H04L 49/55 | |
| 2022/0060370 A1* | 2/2022 | Gage | H04L 45/24 | |
| 2022/0070094 A1* | 3/2022 | Poletti | H04L 45/74 | |
| 2022/0131808 A1* | 4/2022 | Xie | H04L 45/28 | |
| 2022/0131826 A1* | 4/2022 | Levi | H04L 45/02 | |
| 2022/0191061 A1* | 6/2022 | Kamisetty | H04L 12/4641 | |
| 2022/0191134 A1* | 6/2022 | Filsfils | H04L 45/42 | |

* cited by examiner

NETWORK SWITCH AND NETWORK SWITCH SYSTEM THEREOF

CROSS-REFERENCE TO RELATED APPLICATION

This non-provisional application claims priority under 35 U.S.C. § 119(a) to Patent Application No. 109127628 filed in Taiwan, R.O.C. on Aug. 13, 2020, the entire contents of which are hereby incorporated by reference.

BACKGROUND

Technical Field

This application relates to a network switch and a network switch system thereof, and in particular, to a network switch and a network switch system thereof adapted for quickly forming a single loop network.

Related Art

In network technologies, a spanning tree protocol (STP) technology is an important technology for a switch, and is used to avoid various problems caused by a network loop. However, construction of a traditional STP technology takes 30 seconds, and data can be transmitted after the construction is completed. When a network topology changes, the STP technology takes 30 seconds to return to a stable state, and the construction is quite lengthy. Therefore, the predecessors improved the STP technology and proposed a rapid spanning tree protocol (RSTP) technology. However, the rapid STP technology still takes 2-3 seconds to complete/reconstruct the network topology. For an amount of data transmitted in the current network, a large amount of information is lost in the rapid STP.

SUMMARY

In some embodiments, a network switch includes a plurality of connection ports and a processing circuit. Each of the connection ports is in an enabled state or a disabled state by default to form a single loop network. Each of the connection ports in the enabled state receives a data packet in the single loop network and forwards the data packet, and each of the connection ports in the disabled state receives the data packet in the single loop network but does not forward the data packet. The processing circuit is coupled to the connection ports and is configured to determine whether the connection ports forming the single loop network are abnormal and determine whether any of the connection ports forming the single loop network receives a first abnormal message packet from other network switches, where when any of the connection ports receives the first abnormal message packet and one of the connection ports forming the single loop network is in the disabled state, the processing circuit sets the connection port in the disabled state to switch to the enabled state, and the processing circuit does not forward the first abnormal message packet in the single loop network, and when one of the connection ports forming the single loop network is abnormal and each of the connection ports forming the single loop network is in the enabled state, the processing circuit sets the abnormal connection port to switch to the disabled state, and transmits a second abnormal message packet to the other network switches in the single loop network through another connection port that is not abnormal.

In some embodiments, when any of the connection ports receives the first abnormal message packet, if each of the connection ports forming the single loop network is in the enabled state, the processing circuit forwards the first abnormal message packet to the other network switches in the single loop network through another connection port that does not receive the second abnormal message packet.

In some embodiments, the connection port in the enabled state directly switches to the disabled state without going through other port states, and the connection port in the disabled state directly switches to the enabled state without going through the other port states.

In some embodiments, the other port states are a listening state, a learning state, a discarding state, or any combination of the above items.

In some embodiments, after the abnormal connection port switches to the disabled state, if one of the connection ports receives a third abnormal message packet from one of the other network switches, the processing circuit sets the abnormal connection port to be maintained in the disabled state instead of switching to the enabled state.

In some embodiments, the network switch and the other network switches in the single loop network are not root bridges.

In some embodiments, the processing circuit does not send a bridge protocol data unit (BPDU) defined by an STP in the single loop network.

In some embodiments, the processing circuit does not send a media access control (MAC) address of the network switch to the other network switches in the single loop network during forming of the single loop network.

In some embodiments, the first abnormal message packet and the second abnormal message packet do not include a MAC address and an identifier (ID) of the network switch.

In some embodiments, a network switch system includes a first network switch and a second network switch. The first network switch includes a plurality of first connection ports and a first processing circuit. The first connection ports are in an enabled state by default to form the single loop network and transmit, in the single loop network, data packets received from other network switches. The first processing circuit is coupled to the first connection ports, where when one of the first connection ports is abnormal and each of the first connection ports forming the single loop network is in the enabled state, the first processing circuit sets the abnormal first connection port to switch to the disabled state, and transmits an abnormal message packet in the single loop network through another first connection port that is not abnormal. The second network switch includes a second connection port and a second processing circuit. The second connection port is in the disabled state by default to form the single loop network and does not forward a data packet received from the first network switch. The second processing circuit is coupled to the second connection port, where when the second connection port receives the abnormal message packet, the second processing circuit sets the second connection port to switch from the disabled state to the enabled state to form another single loop network, and the second processing circuit does not forward the abnormal message packet.

In some embodiments, the network switch system further includes a third network switch coupled between the first network switch and the second network switch. The third network switch includes a plurality of third connection ports and a third processing circuit. The plurality of third connection ports are in the enabled state by default to form the single loop network and transmit the data packet received from the first network switch to the second network switch in the single loop network. The third processing circuit is coupled to the third connection ports, where when any of the third connection ports receives the abnormal message packet, the third processing circuit forwards the abnormal message packet to the second connection port through another third connection port.

In some embodiments, the first network switch, the second network switch, and the third network switch are not root bridges.

In some embodiments, the abnormal first connection port directly switches to the disabled state without going through other port states, and the second connection port in the disabled state directly switches to the enabled state without going through the other port states.

In some embodiments, the port state is a listening state, a learning state, a discarding state, or any combination of the above items.

In some embodiments, after the abnormal first connection port switches to the disabled state, if one of the first connection ports receives another abnormal message packet, the processing circuit sets the abnormal first connection port to be maintained in the disabled state instead of switching to the enabled state.

In some embodiments, the first processing circuit, the second processing circuit, and the third processing circuit do not send a BPDU defined by an STP in the single loop network.

In some embodiments, the first processing circuit does not send a MAC address of the first network switch to the second network switch during forming of the single loop network, and the second processing circuit does not send a MAC address of the second network switch to the third network switch during forming of the single loop network.

In some embodiments, the abnormal message packet does not include a MAC address and an ID of the first network switch.

DETAILED DESCRIPTION

Figure 1:
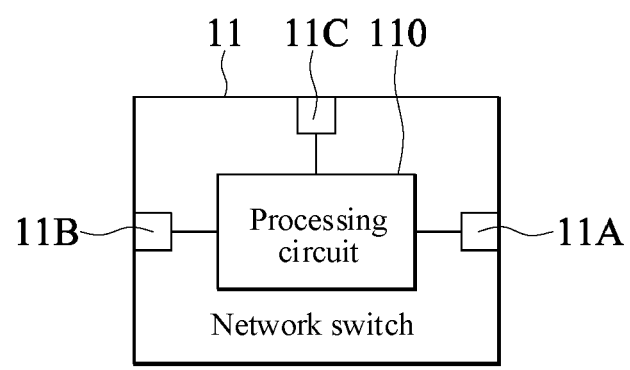
FIG. 1 is a schematic block diagram of an embodiment of a network switch according to this application.

FIG. 1 is a schematic block diagram of an embodiment of a network switch according to this application. Referring to FIG. 1, a network switch 11 includes a processing circuit 110 and a plurality of connection ports 11A, 11B, and 11C. For example, the network switch 11 in FIG. 1 includes three connection ports 11A, 11B, and 11C. However, this application is not limited thereto, and a quantity of ports can also be greater than three.

The connection ports 11A, 11B, and 11C may be in an enabled state or a disabled state by default. The processing circuit 110 is coupled to the connection ports 11A, 11B, and 11C. The processing circuit 110 may set the connection ports 11A, 11B, and 11C to be in the enabled state or the disabled state. When the network switch 11 is in a path of a single loop network, if the connection ports 11A, 11B, and 11C are in the enabled state, the connection ports 11A, 11B, and 11C may receive a data packet sent by a previous network switch in the single loop network, and the connection ports 11A, 11B, and 11C may forward the data packet to a next network switch in the single loop network. In other words, the connection ports 11A, 11B, and 11C in the enabled state may receive the data packet and forward the data packet. If the connection ports 11A, 11B, and 11C are in the disabled state, the connection ports 11A, 11B, and 11C may receive the data packet sent by the previous network switch, but the connection ports 11A, 11B, and 11C do not forward the data packet to the next network switch. In other words, the connection ports 11A, 11B, and 11C in the disabled state may receive the data packet but do not forward the data packet. For example, the connection ports 11A, 11B, and 11C may be connected to an electronic device, such as a cameras or a computer. Taking the camera as an example, the above data packet may be image data.

Figure 2:
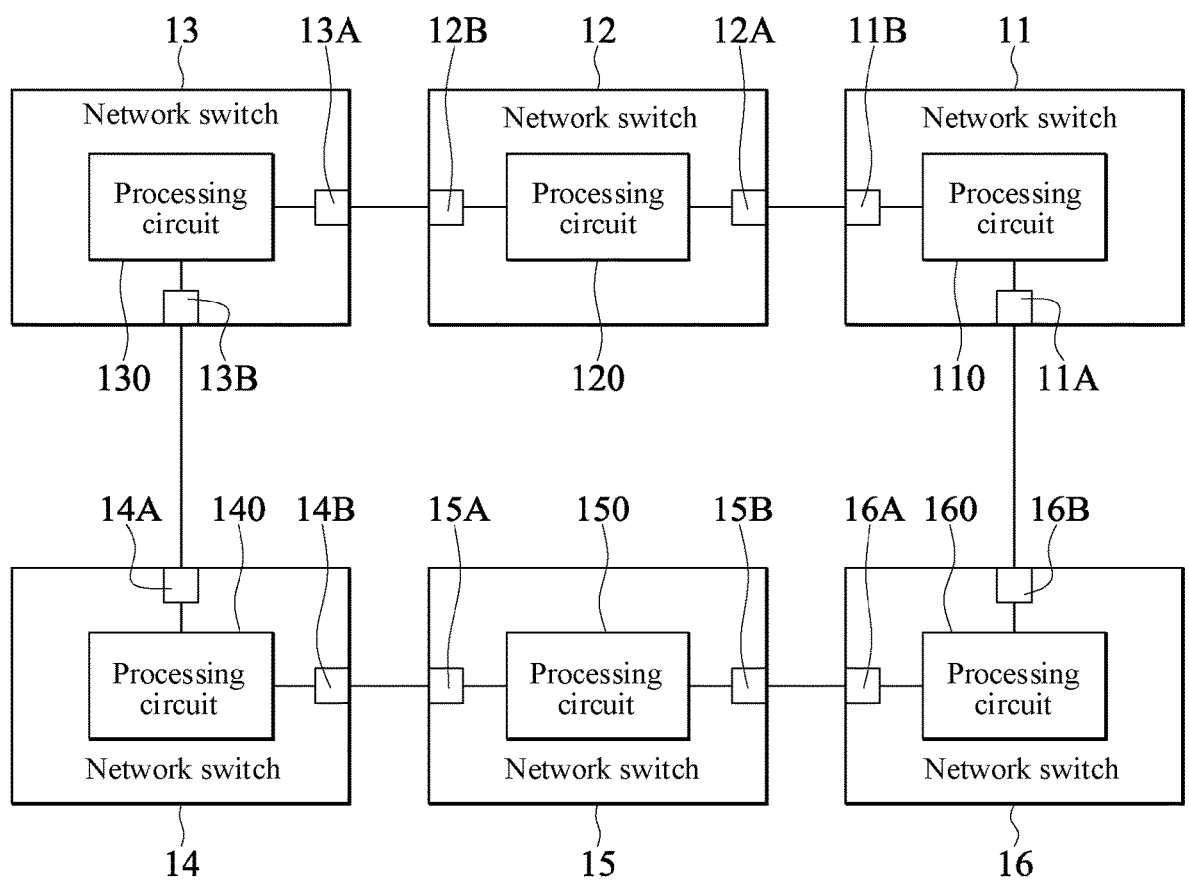
FIG. 2 is a schematic block diagram of an embodiment of a network switch system according to this application.

Based on this, the processing circuit 110 sets the connection ports 11A, 11B, and 11C to be in the enabled state or the disabled state, the connection ports 11A, 11B, and 11C of the network switch 11 may be connected to other connection ports of the same network switch through a transmission line, and other network switches may also set connection ports thereof to be in the enabled state or the disabled state to form the single loop network between the network switch 11 and the other network switches to avoid a network topology loop. For example, referring to FIG. 2, the network switch 11 is connected to other same network switches 12-16, and FIG. 2 only illustrates connection ports 11A-16A and 11B-16B forming a single loop network. As shown in FIG. 2, the network switches 11-16 respectively include processing circuits 110-160, and processing circuits 120-160 of the network switches 12-16 may also set connection ports 12A-16A and 12B-16B thereof to be in the enabled state or the disabled state (that is, the processing circuit 120 may set the connection ports 12A and 12B to be in the enabled state or the disabled state, the processing circuit 130 may set the connection ports 13A and 13B to be in the enabled state or the disabled state, and by analogy), thereby forming the single loop network through the connection ports 11A-16A and 11B-16B. For example, the processing circuit 140 of the network switch 14 may set the connection port 14A to be in the disabled state, and the processing circuits 110-130, 150, 160 of the network switches 11-13, 15, 16 may set other connection ports 11A-13A, 15A, 16A, 11B-16B to be in the enabled state, to establish the single loop network. After the single loop network is established, the network switches 11-16 may transmit data packets to each other, and any of the network switches 11-16 does not receive a data packet sent by the network switch itself. For example, a data packet sent by the network switch 13 is not sent back to the network switch 13 through the network switch 14.

After the single loop network between the network switches 11-16 is formed, if any of the connection ports 11A-11B, 12A-12B in the enabled state is abnormal, the abnormal port may be automatically switched to the disabled state, and the connection ports 11A-11B and 12A-12B in the disabled state may be automatically switched to the enabled state. In other words, the network switches 11-16 may perform a re-establishment procedure of the single loop network to change a network topology.

Referring to FIG. 1 to FIG. 4, the following first takes the network switch 11 and the connection ports 11A and 11B as an example to illustrate operation of each of the network switches 11-16. After the single loop network is formed, in order to detect whether the network topology needs to be changed, the processing circuit 110 determines whether the connection ports 11A and 11B forming the single loop network are abnormal (step S01), and the processing circuit 110 determines whether the connection ports 11A and 11B receive an abnormal message packet from other network switches (step S04). In step S04, if the connection ports 11A and 11B do not receive the abnormal message packet from the other network switches (a determining result is "No"), it indicates that connection ports of the other network switches are normal. When the processing circuit 110 determines in step S01 that either of the connection ports 11A and 11B is abnormal (a determination result of step S01 is "Yes"), for example, the connection port 11A is abnormal and the connection ports 11A and 11B are both in the enabled state, the processing circuit 110 sets the abnormal connection port 11A to switch from the enabled state to the disabled state in the above re-establishment procedure (step S02), and the processing circuit 110 transmits the abnormal message packet to a next network switch in the single loop network through the connection port 11B that is not abnormal and that is in the enabled state (step S03), to continue the re-establishment procedure of the single loop network.

In addition, if no abnormality occurs in the connection ports 11A and 11B, when the processing circuit 110 determines in step S04 that either of the two connection ports 11A and 11B receives an abnormal message packet from a previous network switch in the single loop network, it indicates that a connection port of one of the network switches in the single loop network is abnormal. In this case, in the re-establishment procedure of the single loop network, the processing circuit 110 further determines states of the connection ports 11A and 11B to determine whether one of the connection ports 11A and 11B is in the disabled state (step S05), and then the processing circuit 110 determines whether to switch the connection port in the disabled state to the enabled state according to a determining result. In other words, if the connection ports of the r network switches are abnormal, the processing circuit 110 needs to set either of the connection ports 11A and 11B in the disabled state to switch to the enabled state to establish a new single loop network. For example, the connection port 11A is in the enabled state and the connection port 11B is in the disabled state. If the processing circuit 110 determines in step S05 that the connection port 11B is in the disabled state (a determining result of step S05 is "Yes"), the processing circuit 110 sets the second connection port 11B to switch from the disabled state to the enabled state (step S06), and the processing circuit 110 does not forward the abnormal message packet (step S07).

In addition, in some embodiments, in a in which a connection port of one of the network switches in the above single loop network is abnormal and either of connection ports 11A and 11B receives the abnormal message packet (a determining result of step S04 is "Yes"), if the processing circuit 110 determines in step S05 that the connection ports 11A and 11B are both in the enabled state (the determining result is "No"), it indicates that the connection ports 11A and 11B may forward a data packet in the re-established single loop network. The processing circuit 110 does not need to reset the states of the connection ports 11A and 11B, and the connection ports 11A and 11B are maintained in the enabled state without changing the state. The processing circuit 110 forwards the abnormal message packet to the other network switches in the single loop network through a connection port that does not receive the abnormal message packet in the connection ports 11A and 11B. In other words, the processing circuit 110 forwards the abnormal message packet through the connection port 11A or the connection port 11B connected to the next network switch (step S08). Based on this, each of the processing circuits 110-160 performs steps S01 and S04, and performs subsequent steps S02-S03 and S05-S08 according to determining results of S01 and S04 to complete the re-establishment procedure of the single loop network.

Figure 3:
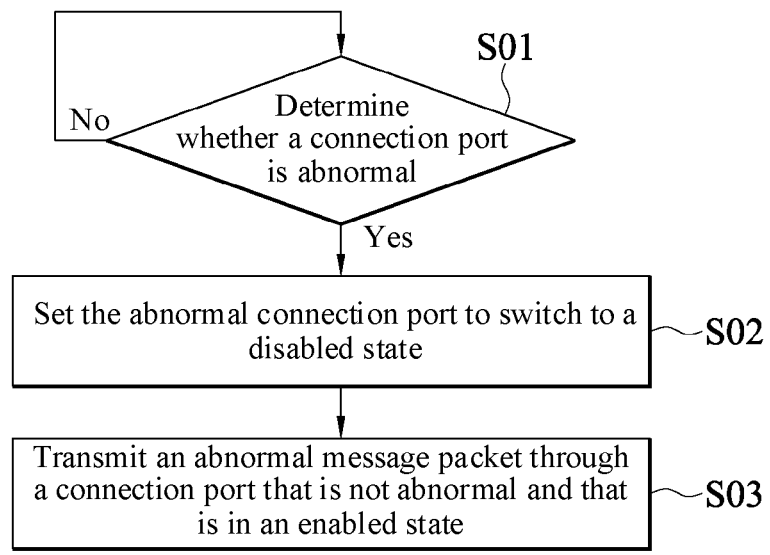
FIG. 3 is a flowchart of an embodiment of a procedure for establishing a single loop network according to this application.
Figure 4:
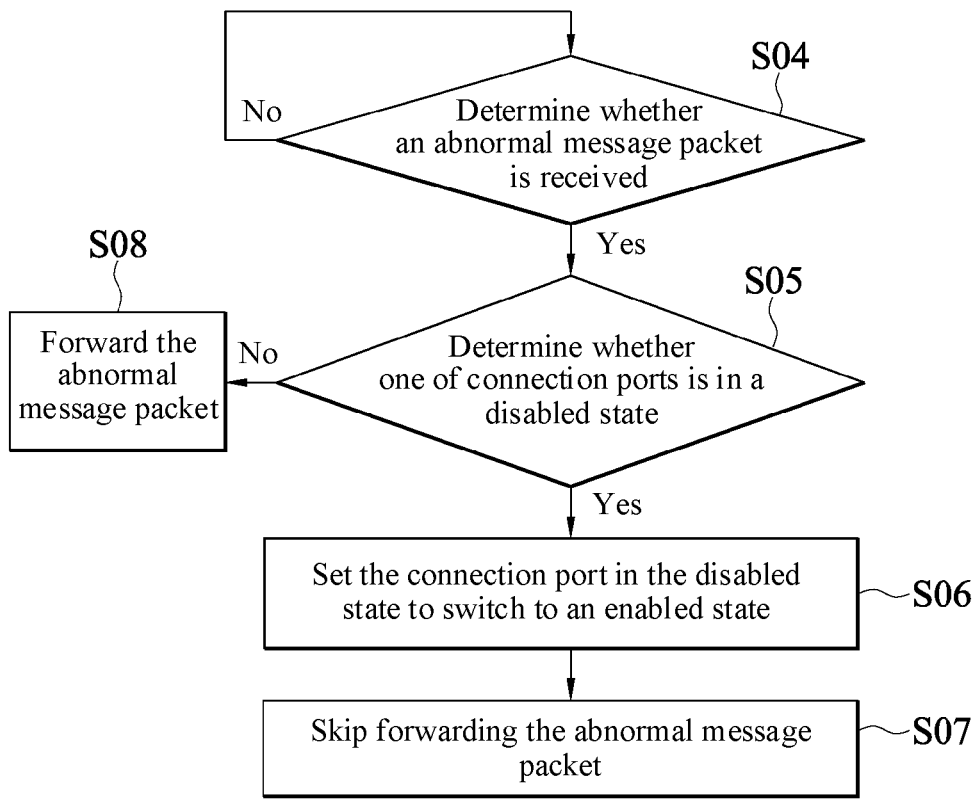
FIG. 4 is a flowchart of another embodiment of a procedure for establishing a single loop network according to this application.
Figure 5:
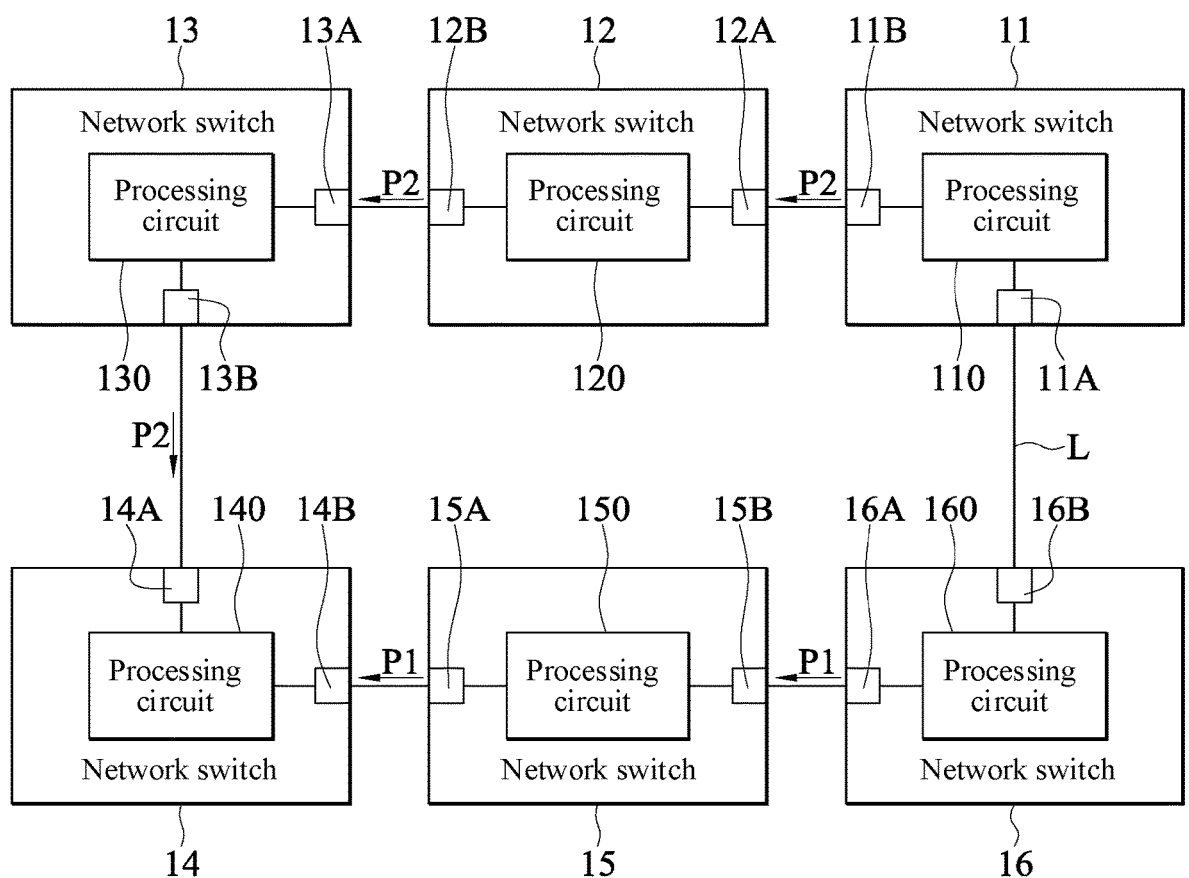
FIG. 5 is a schematic block diagram of an embodiment during operation of the network switch system in FIG. 2.

Referring to FIG. 3 to FIG. 5, for example, the connection ports 11A and 16B are abnormal and the connection port 14A is in the disabled state and the connection ports 11A-13A, 15A, 16A, 11B-16B are in the enabled state. In step S01 the processing circuit 110 determines that the connection port 11A is abnormal (a determining result is "Yes"), and the processing circuit 160 determines that the connection port 16B is abnormal (a determining result is "Yes"). The processing circuit 110 performs step S02 to set the connection port 11A to switch from the enabled state to the disabled state, and the processing circuit 160 performs step S02 to set the connection port 16B to switch from the enabled state to the disabled state. The processing circuit 160 transmits a first abnormal message packet P1 to the network switch 15 through the connection port 16A (step S03), and the processing circuit 110 transmits a second abnormal message packet P2 to the network switch 12 through the connection port 11B (step S03).

Therefore, the processing circuit 120 of the network switch 12 determines in step S04 that the connection port 12A receives the second abnormal message packet P2 from the network switch 11 (a determining result is "Yes"), and the processing circuit 120 determines in step S05 that the connection ports 12A and 12B are both in the enabled state instead of the disabled state (a determining result is "No"). The processing circuit 120 does not switch states of the connection ports 12A and 12B, and the processing circuit 120 forwards the second abnormal message packet P2 to the network switch 13 through the connection port 12B (step S08). Therefore, the processing circuit 130 of the network switch 13 determines in step S04 that the connection port 13A receives the second abnormal message packet P2 from the network switch 12 (a determining result is "Yes"), and then the processing circuit 130 determines in step S05 that the connection ports 13A and 13B are both in the enabled state instead of the disabled state (a determining result is "No"). The processing circuit 130 does not switch states of the connection ports 13A and 13B, and the processing circuit 130 forwards the second abnormal message packet P2 to the network switch 14 through the connection port 13B (step S08). Likewise, after the network switch 16 sends the first abnormal message packet P1, the processing circuit 150 of the network switch 15 determines in step S04 that the connection port 15B receives the first abnormal message packet P1 from the network switch 16 (a determining result is "Yes"), and the processing circuit 150 determines in step S05 that the connection ports 15A and 15B are both in the enabled state instead of the disabled state (a determining result is "No"). The processing circuit 150 does not switch states of the connection ports 15A and 15B, and the processing circuit 150 forwards the first abnormal message packet P1 to the network switch 14 through the connection port 15A (step S08).

Based on this, the processing circuit 140 of the network switch 14 determines in step S04 that the connection port 14B receives the first abnormal message packet P1 and that the connection port 14A receives the second abnormal message packet P2 (a determining result is "Yes"), and the processing circuit 140 determines in step S05 that the connection port 14A is in the disabled state. Therefore, the processing circuit 140 sets the connection port 14A to switch from the disabled state to the enabled state (step S06) to establish a new single loop network, and the processing circuit 140 does not forward the first abnormal message packet P1 to the network switch 13 and does not forward the second abnormal message packet P2 to the network switch 15 (step S07), thereby completing the re-establishment procedure of the single loop network.

In some embodiments, taking the network switch 11 as an example, when either of the connection ports 11A and 11B is abnormal, the processing circuit 110 may store an abnormal message for an administrator or a user of the network switch 11 to process the abnormal condition.

In some embodiments, the network switches 11-16 may automatically set the connection ports 11A-16A and 11B-16B to be in the enabled state or the disabled state according to user's setting after power-on, so that the establishment of the single loop network is completed. Based on this, in the process of establishing and re-establishing the single loop network, the network switches 11-16 do not perform a procedure of determining a root bridge, that is, the network switches 11-16 do not transmit MAC addresses and IDs thereof to each other during forming of the single loop network to determine the root bridge, and the network switches 11-16 do not need to determine that each of the connection ports 11A-16A and 11B-16B is a root port, a designated port, or an alternate port based on the above MAC addresses and IDs. In this way, a speed of establishing the single loop network can be greatly increased.

Furthermore, after the single loop network is established, when the connection ports 11A and 16B are abnormal and the network topology needs to be changed, the connection ports 11B and 16A respectively send the abnormal message packets P2 and P1 to next network switches 12 and 15, where the abnormal message packets P2 and P1 do not include MAC addresses and IDs of the network switches 11 and 16. The next network switch 12 and 15 that receive the abnormal message packets P2 and P1 forward the abnormal message packets P2 and P1. Until the abnormal message packets P2 and P1 are forwarded to the network switch 14 having the connection port 14A in the disabled state, the transmission of the abnormal message packets P2 and P1 stops. In other words, in the process of re-establishing the single loop network, an abnormal network switch in network switches 11-16 does not send a message packet to the root bridge for the root bridge to notify other network switches. In this way, a speed of establishing the single loop network can be greatly increased.

In some embodiments, the network switches 11-16 do not periodically exchange bridge protocol data units (BPDU) defined in an STP. In this way, an amount of data exchange between the network switches 11-16 can be reduced. Furthermore, when switching port states of the connection ports 11A-16A and 11B-16B, the network switches 11-16 set the connection ports 11A-16A and 11B-16B to directly switch from the disabled state to the enabled state or directly switch from the enabled state to the disabled state. In other words, in the process in which the connection ports 11A-16A and 11B-16B switch from the disabled state to the enabled state or from the enabled state to the disable state, the connection ports directly switch to the disabled state or the enabled state without going through other port states (for example, a listening state, a learning state, and a discarding state), and each of the connection ports 11A-16A and 11B-16B does not need to wait for a BPDU to switch a port state thereof. In this way, a speed of establishing the single loop network can be increased.

In some embodiments, the above enabled state may be a forwarding state defined by the STP, the above disabled state may be a blocking state defined by the STP, and the abnormal message packets P1 and P2 may be BPDUs defined by the STP. Based on this, the network switches 11-16 may also be applied to the STP and a rapid STP (RSTP).

In some embodiments, the connection port 11A is connected to the connection port 16B through a transmission line L. When a data packet cannot be transmitted between the network switches 16 and 11 normally because the transmission line L is disconnected from the connection ports 11A and 16B, the transmission line L is damaged, or the connection ports 11A and 16B are damaged, the processing circuit 110 may determine in step S01 that the connection port 11A is abnormal, and the processing circuit 160 may determine in step S01 that the connection port 16B is abnormal.

In some embodiments, taking the network switch 11 as an example, after the abnormal connection port 11A switches to the disabled state, if the connection ports 11A and 11B of the network switch 11 receive abnormal message packets from other network switches 12-16, the processing circuit 110 sets the abnormal port 11A to be maintained in the disabled state instead of switching to the enabled state, to avoid a case in which the abnormal connection port 11A switches to the enabled state and cannot transmit a data packet normally. Likewise, taking the network switch 16 as an example, after the abnormal connection port 16B switches to the disabled state, if the connection ports 16A and 16B of the network switch 16 receive abnormal message packets from other network switches 11-15, the processing circuit 160 sets the abnormal port 16B be maintained in the disabled state instead of switching to the enabled state, to avoid a case in which the abnormal connection port 16B switches to the enabled state and cannot transmit a data packet normally.

In view of the above, according to an embodiment of the network switch and the network switch system thereof in this application, in a process of establishing a e single loop network, a procedure of determining a root bridge between network switches is avoided, and the network switches do not need to determine a role of a connection port by using MAC addresses and IDs of the network switches. Therefore, when a network topology needs to be changed, the network switch does not need to notify other network switches through the root bridge, and the single loop network can be quickly established. Different from an STP technology and an RSTP technology, the network switch system can complete the establishment of the single loop network within 1 ms, and an amount of data lost by a user of the network switch can be minimized.

Although the application has been described in considerable detail with reference to certain preferred embodiments thereof, the disclosure is not for limiting the scope of the application. Persons having ordinary skill in the art may make various modifications and changes without departing from the scope and spirit of the application. Therefore, the scope of the appended claims should not be limited to the description of the preferred embodiments described above.

What is claimed is:

1. A network switch adapted for forming a single loop network, the network switch comprising:
   a plurality of connection ports, wherein each of the connection ports is in an enabled state or a disabled state by default to form the single loop network, each of the connection ports in the enabled state receives a data packet in the single loop network and forwards the data packet, and each of the connection ports in the disabled state receives the data packet in the single loop network but does not forward the data packet; and a processing circuit coupled to the connection ports and configured to determine whether the connection ports forming the single loop network are abnormal and determine whether any of the connection ports forming the single loop network receives a first abnormal message packet from other network switches, wherein when any of the connection ports receives the first abnormal message packet and one of the connection ports forming the single loop network is in the disabled state, the processing circuit sets the connection port in the disabled state to switch to the enabled state, and the processing circuit does not forward the first abnormal message packet in the single loop network, and when one of the connection ports forming the single loop network is abnormal and each of the connection ports forming the single loop network is in the enabled state, the processing circuit sets the abnormal connection port to switch to the disabled state, and transmits a second abnormal message packet to the other network switches in the single loop network through another connection port that is not abnormal, wherein the connection port in the enabled state directly switches to the disabled state without going through other port states, and the connection port in the disabled state directly switches to the enabled state without going through the other port states, and wherein the first abnormal message packet and the second abnormal message packet do not comprise a MAC address and an identifier (ID) of the network switch.

2. The network switch according to claim 1, wherein when any of the connection ports receives the first abnormal message packet, if each of the connection ports forming the single loop network is in the enabled state, the processing circuit forwards the first abnormal message packet to the other network switches in the single loop network through another connection port that does not receive the second abnormal message packet.

3. The network switch according to claim 1, wherein the other port states are a listening state, a learning state, a discarding state, or any combination of the above items.

4. The network switch according to claim 1, wherein after the abnormal connection port switches to the disabled state, if one of the connection ports receives a third abnormal message packet from one of the other network switches, the processing circuit sets the abnormal connection port to be maintained in the disabled state instead of switching to the enabled state.

5. The network switch according to claim 1, wherein the network switch and the other network switches in the single loop network are not root bridges.

6. The network switch according to claim 1, wherein the processing circuit does not send a bridge protocol data unit (BPDU) defined by a spanning tree protocol (STP) in the single loop network.

7. The network switch according to claim 1, wherein the processing circuit does not send a media access control (MAC) address of the network switch to the other network switches during forming of the single loop network.

8. A network switch system adapted for forming a single loop network, the network switch system comprising:
a first network switch comprising:
a plurality of first connection ports, wherein the first connection ports are in an enabled state by default to form the single loop network and transmit, in the single loop network, data packets received from other network switches; and
a first processing circuit coupled to the first connection ports, wherein when one of the first connection ports is abnormal and each of the first connection ports forming the single loop network is in the enabled state, the first processing circuit sets the abnormal first connection port to switch to the disabled state, and transmits an abnormal message packet in the single loop network through another first connection port that is not abnormal; and
a second network switch coupled to the first network switch and comprising:
a second connection port coupled to the first network switch, wherein the second connection port is in the disabled state by default to form the single loop network and does not forward a data packet received from the first network switch; and
a second processing circuit coupled to the second connection port, wherein when the second connection port receives the abnormal message packet, the second processing circuit sets the second connection port to switch from the disabled state to the enabled state to form another single loop network, and the second processing circuit does not forward the abnormal message packet,
wherein the abnormal first connection port directly switches to the disabled state without going through other port states, and the second connection port in the disabled state directly switches to the enabled state without going through the other port states, and
wherein the abnormal message packet does not comprise a MAC address and an identifier (ID) of the first network switch.

9. The network switch system according to claim 8, further comprising:
a third network switch coupled between the first network switch and the second network switch and comprising:
a plurality of third connection ports, wherein the third connection ports are in the enabled state by default to form the single loop network and transmit the data packet received from the first network switch to the second network switch in the single loop network; and
a third processing circuit coupled to the third connection ports, wherein when any of the third connection ports receives the abnormal message packet, the third processing circuit forwards the abnormal message packet to the second connection port through another third connection port.

10. The network switch system according to claim 9, wherein the first network switch, the second network switch, and the third network switch are not root bridges.

11. The network switch system according to claim 8, wherein the port state is a listening state, a learning state, a discarding state, or any combination of the above items.

12. The network switch system according to claim 8, wherein after the abnormal first connection port switches to the disabled state, if one of the first connection ports receives another abnormal message packet, the processing circuit sets the abnormal first connection port to be maintained in the disabled state instead of switching to the enabled state.

13. The network switch system according to claim 9, wherein the first processing circuit, the second processing circuit, and the third processing circuit do not send a bridge protocol data unit (BPDU) defined by a spanning tree protocol (STP) in the single loop network.

14. The network switch system according to claim 9, wherein the first processing circuit does not send a media access control (MAC) address of the first network switch to the second network switch during forming of the single loop network, and the second processing circuit does not send a MAC address of the second network switch to the third network switch during forming of the single loop network.

\* \* \* \* \*